Patented June 9, 1942

2,286,034

UNITED STATES PATENT OFFICE 2,286,034

PREPARATION OF SUBSTITUTED ALDEHYDES

William F. Gresham, Wilmington, Del., assignor to E. I. du Pont de Nemours & Company, Wilmington, Del., a corporation of Delaware No Drawing. Application April 4, 1939, Serial No. 265,969

2 Claims. (Cl. 260—602)

This invention relates to a process for the preparation of oxy-substituted acetaldehydes and particularly to the preparation of alkoxy, aryloxy and acyloxy acetaldehydes from glycol ethers.

The products of the invention are designated generically by the formula, $CH_2(OX)CHO$, in which X is an alkyl, alkoxy alkyl, aryl or an acyl group; specific examples of these products include the alkoxy acetaldehydes such as methoxy acetaldehyde, $CH_2(OCH_3)CHO$; methoxy methoxy acetaldehyde, $CH_2(OCH_2OCH_3)CHO$; ethoxy acetaldehyde, $CH_2(OC_2H_5)CHO$; propoxy and isopropoxy acetaldehyde, $CH_2(OC_3H_7)CHO$; butoxy and ixobutoxy acetaldehyde, $$CH_2(OC_4H_9)CHO$$

and higher homologues thereof, as well as phenoxy acetaldehyde, $CH_2(OC_6H_5)CHO$; and benzoxy acetaldehyde, $CH_2(OCH_2C_6H_5)CHO$, and the acyloxy acetaldehydes such as, acetoxy acetaldehyde, $CH_3COOCH_2CHO$. The oxy-substituted aldehydes of the invention are prepared from corresponding monoalkyl, monoalkoxy alkyl, and monoaryl ethers of ethylene glycol. Accordingly, the alkoxy acetaldehydes above designated may be prepared, respectively, from the monomethyl, monomethoxy methyl, monoethyl, monopropyl, monobutyl, and monoisobutyl ethers of ethylene glycol, while the aryloxy acetaldehydes may be prepared, respectively, from the monophenyl ether and the monobenzyl ether of ethylene glycol and acetoxy acetaldehyde from glycol monoacetate, $(CH_3COOCH_2.CH_2OH)$.

An object of the present invention is to provide a process for the preparation of the above designated oxy-substituted acetaldehydes. Another object of the invention is to provide a process for the preparation of alkoxy and aryloxy acetaldehydes by the dehydrogenation of monoalkyl or monoaryl ethers of ethylene glycol. Another object of the invention is to provide suitable catalysts and conditions under which the process may be carried out. Other objects and advantages of the invention will hereinafter appear.

The process of the invention may be conducted by passing a vaporized ether of ethylene glycol, preferably in the presence of an inert diluent, over a dehydrogenation catalyst in accord with the equation:

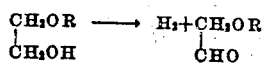

in which R is an alkyl group such, for example, as methyl, ethyl propyl, isopropyl, butyl, isobutyl, amyl and higher alkyl groups; an alkoxy alkyl group such as methoxy methyl, ethoxy methyl, propoxy methyl, etc., an aryl group such as phenyl, benzyl and the like, or a phenoxy alkyl group such as phenoxy methyl. The reaction is conducted in the presence of a suitable dehydrogenation catalyst at temperatures ranging between 200 and 375° C. with a preferred temperature ranging between 250 and 325° C. Pressures between 5 and 1000 atmospheres may be employed although the reaction will proceed at a favorable rate under pressures in the neighborhood of atmospheric.

Dehydrogenation catalysts which are suitable for conducting this reaction may be obtained by fusing copper oxide alone or in conjunction with another metal oxide such, for example, as magnesium oxide, nickel oxide or the like and subsequently reducing the resulting fusion of metals. The catalysts of this type are more fully described in the copending application of A. T. Larson, S. N. 171,894, filed October 30, 1937. Copper and nickel bearing catalysts may likewise be used as well as copper-nickel and copper-silicon catalysts prepared by precipitation of a mixture of their salts followed by reduction. Copper zinc chromate catalysts similarly prepared may also be used as well as fused and reduced mixtures of copper oxide and zinc oxide. Straight nickel catalysts or nickel catalysts promoted with cerium may be used but due to their more powerful catalytic effectiveness very mild conditions should be employed to prevent conversion to hydrocarbons. A very effective catalyst for the dehydrogenation can be prepared by fusing a mixture of copper oxide, (CuO) silicon dioxide ($SiO_2$) and chromium oxide ($CrO_3$) in a preferred molal ratio of 100:10:5, the fused mixture is reduced and, after cooling, crushed to a suitable size prior to use. Other suitable dehydrogenation catalysts may be used.

It has been found advantageous to conduct the reaction in the presence of water vapor or other inert diluent such as nitrogen and carbon dioxide, and it is desirable to maintain, on a molal basis, the ratio of water vapor (or other diluent) to the glycol ether at approximately 0.4 mol thereof per mol of the ether. Without the use of diluents, dehydrogenation catalysts generally lose their initial activity very rapidly.

The more detailed practice of the invention is illustrated by the following examples in which parts given are by weight unless otherwise stated.

There are, of course, many forms of the invention other than these specific embodiments.

*Example 1.*—An equimolar mixture of monomethyl ether of ethylene glycol and water was passed into a catalyst chamber electrically heated to a temperature between 250 and 260° C. The chamber was charged with a metal catalyst prepared by fusing a mixture containing 100 mols of copper oxide, 10 mols of silica and 5 mols of chromium oxide, ($CrO_3$). The resulting fused catalyst was crushed to 8 to 14 mesh size and then reduced in an atmosphere of hydrogen at approximately 300° C. Prior to direct contact with the catalyst the glycol ether-water mixture was preheated to substantially reaction temperature, and, after passing through the reaction zone (at a space velocity of 3000–4000 based on water plus glycol ether), the reaction product, which consisted essentially of methoxy acetaldehyde and water, was condensed. Upon fractionation an approximately 40% yield of methoxy acetaldehyde was obtained.

*Example 2.*—An equimolar mixture of glycol methyl ether and water was vaporized over a catalyst, (prepared as described in Example 1 from 100 mols of copper oxide, 50 mols of silica and 10 mols of chromic oxide) at 300° C. and a total space velocity of 4000. The product was condensed and methoxy acetaldehyde was obtained as a water azeotrope by distillation. The yield of methoxy acetaldehyde, based on the weight of glycol methyl ether used, was approximately 30%.

*Example 3.*—Glycol methyl ether containing an equimolar quantity of water was vaporized over a reduced catalyst (prepared from 90 mols of copper oxide and 10 mols of silica) at 320–330° C. and a total space velocity of 3,000. Methoxyacetaldehyde was isolated from the product in 34% yield calculated as in Example 2.

*Example 4.*—Methoxymethoxyethanol was vaporized over the copper-silica-chromium catalyst described in Example 1 at 280–290° C. and a space velocity of 1500. The reaction product was condensed and fractionally distilled. Methoxymethoxyacetaldehyde (b. p. 135–138° C.) was obtained.

*Example 5.*—The process of Example 2 was repeated using glycol monoacetate and a fused metal catalyst which, prior to fusion, had the composition, copper oxide (CuO), 100 mols; silicon dioxide ($SiO_2$), 10 mols; and chromium oxide ($CrO_3$), 5 mols. The reaction was conducted at approximately 290° C. and acetoxy acetaldehyde (boiling point 90° C. at 50 mm.) recovered from the reaction products by distillation.

From a consideration of the above specification it will be realized that many changes may be made in the details therein given without departing from the scope of the invention or sacrificing any of the advantages that may be derived therefrom.

I claim:

1. A process for the preparation of methoxy acetaldehyde which comprises dehydrogenating monomethyl ether of ethylene glycol at a temperature between 200 and 375° C., in the presence of water vapor using a fused and reduced metal oxide catalyst containing copper oxide, silicon dioxide and chromium oxide in the molal ratio prior to fusion of 100:10:5.

2. A process for the preparation of methoxy acetaldehyde which comprises introducing an equimolar mixture of water and monomethyl ether of ethylene glycol into a reaction zone containing a fused and reduced copper-silicon-chromium catalyst, maintaining the reaction zone at a temperature between 250 and 325° C., condensing the reaction product and recovering therefrom methoxy acetaldehyde.

WILLIAM F. GRESHAM.